United States Patent [19]

Yamauchi et al.

[11] 4,404,846
[45] Sep. 20, 1983

[54] AIR FLOW RATE MEASURING DEVICE INCORPORATING HOT WIRE TYPE AIR FLOW METER

[75] Inventors: Teruo Yamauchi, Katsuta; Yoshishige Ohyama, Katsuta; Hiroshi Kuroiwa, Hitachi; Mamoru Fujieda, Nishiibaraki; Tadashi Kirisawa, Hitachi, all of Japan

[73] Assignee: Hitachi, Ltd., Tokyo, Japan

[21] Appl. No.: 302,435

[22] PCT Filed: Jan. 28, 1981

[86] PCT No.: PCT/JP81/00018
§ 371 Date: Sep. 9, 1981
§ 102(e) Date: Sep. 9, 1981

[87] PCT Pub. No.: WO81/02202
PCT Pub. Date: Aug. 6, 1981

[30] Foreign Application Priority Data

Jan. 31, 1980 [JP] Japan .................. 55-11346

[51] Int. Cl.³ .............................................. G01F 1/68
[52] U.S. Cl. ......................................... 73/118; 73/204; 123/494; 123/478
[58] Field of Search ............. 73/118 A, 204; 123/478, 123/480, 486, 494; 364/510

[56] References Cited

U.S. PATENT DOCUMENTS 4,322,970 4/1982 Peter .................................... 73/118

*Primary Examiner*—Herbert Goldstein
*Attorney, Agent, or Firm*—Antonelli, Terry & Wands

[57] ABSTRACT

The invention relates to an air flow rate measuring device making use of a hot wire type air flow meter and adapted to measure the true intake air flow rate while compensating for the error attributable to the reversing of the air. The device includes an operation unit adapted to accumulate the output from the hot wire type air flow meter to calculate an apparent intake air flow rate $Q_a = Q_1 + Q_2$, where $Q_1$ is the flow rate during reversing of the air while $Q_2$ represents the flow rate during forward flowing of the air. The apparent flow rate $Q_a$ is discriminated by a signal derived from means for detecting the period in which the reversing of intake air takes place into the flow rate $Q_1$ in the reversing or backward direction and the flow rate $Q_1$ in the forward direction, by means of the operation unit. Another operation unit performs the calculation of difference $Q_2-Q_1$ to determine the true air flow rate $Q_o$.

4 Claims, 10 Drawing Figures

AIR FLOW RATE MEASURING DEVICE INCORPORATING HOT WIRE TYPE AIR FLOW METER

TECHNICAL FIELD

The present invention relates to an air flow rate measuring device and, more particularly, to an air flow rate measuring device incorporating a hot wire type air flow meter suitable for use in automobiles.

BACKGROUND ART

A device for measuring the flow rate of intake air in an automobile engine, of the type having a resistance element having a resistance temperature coefficient and disposed in the intake air passage and adapted to measure the intake air flow rate using the change in the resistance, is known by, for example, U.S. Pat. No. 3,747,577. This resistance element is heated within the intake air passage of the engine by electric current supplied thereto, and the resistance value thereof is changed in accordance with the flow rate of the intake air in the intake passage.

In automobile engines, the air-fuel ratio is controlled upon detection of the intake air flow rate per one suction stroke of the engine by accumulating the intake air flow rate. It is, therefore, very important to precisely detect the flow rate of the intake air. An inaccurate measurement leads to an incorrect control of the air-fuel ratio.

The size of the hot wire type air flow meter is advantageously small but this type of flow meter has a drawback that it cannot detect the direction of flow of the air. Therefore, it is not possible to measure the correct or true intake air flow rate by a mere accumulation of the output of the hot wire type air flow meter, particularly in the low speed region of operation of a 4-cylinder internal combustion engine.

DISCLOSURE OF INVENTION

Accordingly, an object of the invention is to provide an air flow rate measuring device having a hot wire type air flow meter improved for use in automobile engines.

Another object of the invention is to provide an air flow rate measuring device incorporating a hot wire type air flow meter capable of measuring the true intake air flow rate in automobile engines.

When a 4-cylinder engine is operating at a low speed, the intake air flow rate (instantaneous value) of the engine fluctuates largely. In addition, in the region near the top dead center, the intake valve and the exhaust valve are opened simultaneously so that the intake air is forced back by the pressure which acts to reverse the flow of gas from the exhaust valve toward the intake valve. This reversing of the gas does not take place when the intake valve solely is kept opened.

The reversing of the gas takes place in the low speed region of 600 to 3000 R.P.M. and in the region of low intake vacuum of below −100 mmHg. The hot air type flow meter produces the detection signal irrespective of the flowing direction of the air.

Representing the apparent intake air amount obtained by an integration or accumulation of the hot wire type flow meter by $Q_a(m^3)$, the air amount flowing in the reverse direction by $Q_1(m^3)$, the air amount in the forward direction by $Q_2(m^3)$ and the true air amount by $Q_0(m^3)$, the following equations (1) and (2) are established.

$$Q_a = Q_1 + Q_2 \quad (1)$$

$$Q_0 = Q_2 - Q_1 \quad (2)$$

Thus, the true air flow rate $Q_0$ is given as the difference between the flow rate $Q_2$ in the forward direction and the flow rate $Q_1$ in the backward direction.

According to the invention, the apparent air flow rate $Q_a$ is measured by integrating or accumulating the output of the hot wire type air flow meter disposed in the intake air passage, and a signal representing the period of reversing flow is generated to divide the apparent air flow rate $Q_a$ into the flow rate $Q_1$ in the backward direction and the flow rate $Q_2$ in the forward direction. Then, the difference $Q_2 - Q_1$ is calculated by an operation unit to determine the true air flow rate $Q_0$.

According to an embodiment of the invention, there is provided a memory device adapted to memorize the crank angle corresponding to engine speed, and a crank angle sensor adapted to produce a signal corresponding to the crank angle of the engine. The period of the backward flow of intake air is read out from the memory device in accordance with the output signal from the crank angle sensor, so that the apparent air flow rate $Q_a$ is divided into the flow rate $Q_1$ in the backward direction and the flow rate $Q_2$ in the forward direction, and the difference $Q_2 - Q_1$ is calculated by the operation unit $Q_2 - Q_1$ to determine the true air flow rate $Q_0$.

BEST MODE FOR CARRYING OUT THE INVENTION

Figure 1:
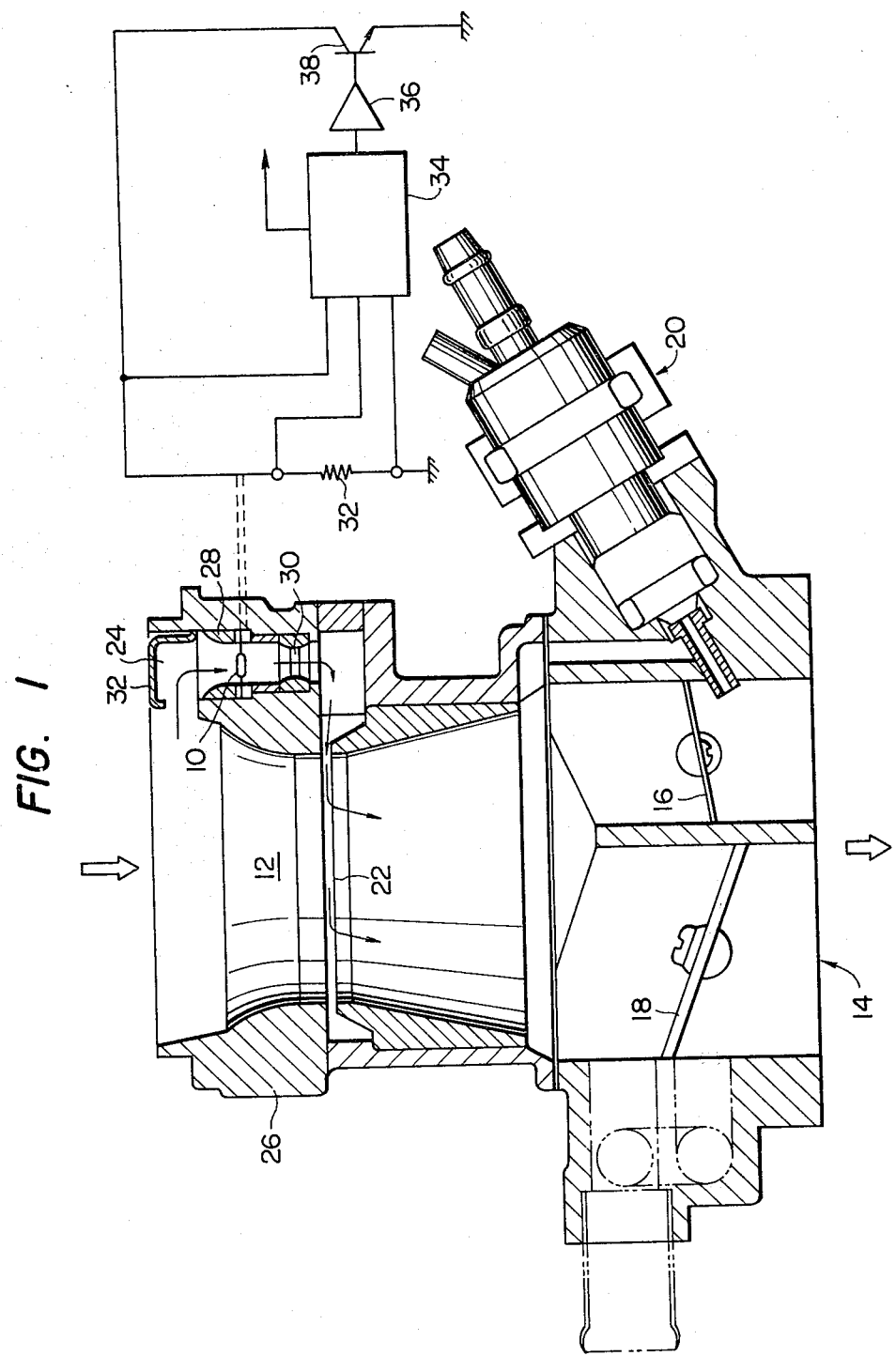
FIG. 1 is a sectional view of an embodiment of the invention, showing particularly the mounting structure for a hot wire type sensor.

FIG. 1 shows how an air flow rate sensor 10 is mounted. At the lower side of the main venturi 12, disposed is a throttle chamber 14 provided with a primary and a secondary throttle valves 16 and 18. Also, a fuel injector 20 for injecting the fuel at the downstream side of the primary throttle valve is secured to the throttle chamber 14. The air flows through an air filter (not shown) provided at the upstream side of the main venturi 12 and flows through the latter so as to be mixed with the fuel injected from the injector to form an air-fuel mixture which is supplied into the cylinder of the internal combustion engine.

A part of the intake air flows into a bypass passage 24 due to a pressure difference between the upstream side of the main venturi 12 and the slit 22, as indicated by an arrow. The bypass passage 24 is provided at a portion of a venturi chamber body 26 which forms a main venturi 7. Namely, the air which has passed through the bypass passage 24 merges in the flow in main venturi 12 through a slit 22 formed around the inner wall of the main venturi 12.

The flow of intake air is uniformalized by an air guiding plate 28 made of a metal or an insulating material disposed at the upstream side of the sensor 10. The guide plate 28 has an aperture of preferably a circular form. Accordingly, the bypass passage 24 preferably has a circular form. A reference numeral 30 designates an orifice for maintaining a constant value of the ratio between the flow rate in the main venturi 12 and the flow rate in the bypass passage 24. This ratio is referred to as "shunting ratio". A dust cover 32 covers an area greater than the area of the aperture of the guiding plate 28, thereby to prevent dusts or other foreign matters from coming directly into the bypass passage 24.

The sensor 10, which is disposed in the passage 24 of air and having an electric characteristics changeable in accordance with the air flow rate, is grounded through a resistance 32. The sensor 10 and the resistance 32 constitute two sides of a bridge circuit.

The voltage appearing at the terminals of the resistance 32 is transmitted to the control circuit 34. The output from the circuit 34 is transmitted to an amplifier 36 the output of which is used for the control of the power transistor 38. The measurement sensor 10 is connected at its one end to the collector of a power transistor 38. The electric current I flowing in the measurement sensor 10 is detected by the resistance 32.

Also, the current I is controlled by the control circuit 34 and the transistor 38 in such a manner as to maintain a constant temperature of the sensor 10, i.e. a constant resistance value of the same.

Accordingly, the relationship between the current I and the air flow rate Q is represented by the following equation.

$$I^2 = (K_1 + K_2\sqrt{Q})(t_w - t_a)S$$

It is, therefore, possible to detect the flow rate Q by measuring the current I. In above equation, symbols $K_1, K_2$ and S represent constants, $t_w$ represents the temperature of the sensor 10 and $t_a$ represents the temperature of the atmosphere.

The analog signal $Q_{an}$(m³/min) representing the flow rate of air in the air passage 24 is supplied to an analog-to-digital converter (referred to as A/D converter, hereinunder) 40 and is converted into a digital signal $Q_d$(m³/min). A data processing unit 42 picks up the digital signal $Q_d$ at each predetermined rotation angle of the crank shaft of the engine, e.g. at every 1°., and calculates the mean value of the digital signal at each predetermined angular movement of the crank shaft, e.g. at every 5°, to produce a signal $Q_f$ of a pulse frequency corresponding to the mean air flow rate.

The crank angle sensor 44 is provided with a movable core 46 connected to the crank shaft (not shown) of the internal combustion engine and a pick-up 48 opposing to the movable core 46, and produces a pulse signal at each predetermined angular movement of the crank shaft, e.g. at every 1°. A reference crank angle sensor 49 has a movable core 50 connected to the crank shaft and a pickup 51 opposing to the movable core 50, and produces an output pulse at each time the crank shaft passes the top dead center. The pulse of the sensor 44 is in synchronization with the sensor 49.

An operation unit 52 is adapted to accumulate, in accordance with the outputs from the data processing unit 42, crank angle sensors 44,49 and memory devices 53,54,56 and 58, the air flow rate signal presented by the data processing unit 42 to divide the calculated value into the flow rate $Q_1$ in the backward direction and the flow rate $Q_2$ in the forward direction. The operation unit 60 serves to determine the difference between the flow rates $Q_1$ and $Q_2$.

Figure 3:
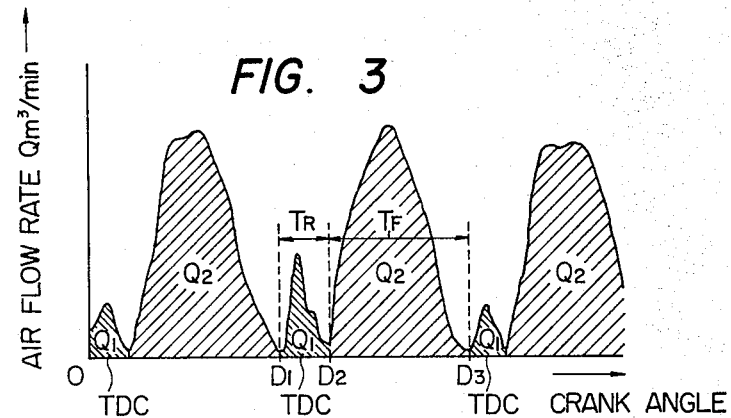
FIG. 3 is a graphical representation of an analog output waveform of a hot wire sensor.

The intake air flow rate in 4-cylinder engine, particularly when the engine speed is low, pulsates in relation to time as shown in FIG. 3. A reversing of air from the exhaust valve side to the intake valve side is observed when the piston takes a position around the top dead center where both of the exhaust valve and the intake valve are opened simultaneously. The hot wire type air flow rate sensor 10 produces a detection signal irrespective of the flowing direction of the air, so that the output of the sensor has a pulsating waveform as shown in FIG. 3. In this Figure, $T_R$ represents the period over which both of the intake and exhaust valves are kept opened to permit the reversing of the intake air, while $T_R$ represents the period in which the exhaust valve $T_F$ is opened solely to cause the air to flow in the forward direction. Thus, the flow rates in one suction stroke in the backward and forward directions are $Q_1$(m³) and $Q_2$(m³), respectively, and the total air flow rate $Q_0$ actually charged in one suction stroke in the cylinder is represented as the difference $Q_2-Q_1$.

Figure 4:
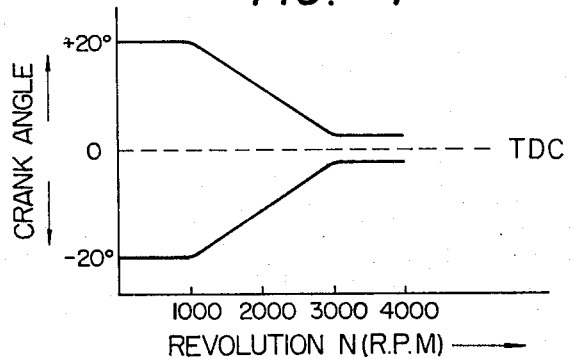
FIG. 4 is a graphical representation of the period in which the reversing flow of the intake air takes place.

The period $T_R$ over which the backward flow takes place has a functional relation to the revolution speed N of the engine as will be seen from FIG. 4. More specifically, this period corresponds to about ±20° around the top dead center by the crank angle. The period is shortened as the engine speed N is increased, and almost no reversing takes place at the high-speed region in excess of 3000 R.P.M.

Memory devices 53 and 54 are adapted to memorize a curve $C_1$ representing the crank angle $D_s$ of commencement of the backward or reverse flow of air and the engine speed N, and a curve $C_2$ representing the relationship between the crank angle $D_T$ at which the reversing flow is ceased and the engine speed N, and deliver respective outputs in accordance with the engine speed N derived from the operation unit 52.

Representing the engine speed by $N_1$ (e.g. 500 R.P.M.), the pickup 48 of the crank angle sensor 44 delivers an output pulse corresponding to the speed $N_1$ to the input terminal of the operation unit 52 which is reading the crank angle corresponding to the engine speed $N_1$, e.g. 20° before the top dead center. As the crank shaft angle reaches $D_1$ shown in FIG. 3 ($D_1$: 20° before top dead center), the operation unit 52 decides upon receipt of the signal from the memory device 53 that the period of the reversing flow has just started, and the value accumulated by the data processing unit 42 from this moment is stored in the memory device 56. Then, as the crank shaft angle $D_2$ (20° after top dead center) is reached, the operation unit 52 judges that the period $T_R$ of reversing is over, and stops to store the accumulated value in the memory device 56. Thereafter, the value accumulated by the data processing unit 42 is stored in the memory device 58. The value accumulated by the data processing unit 42 later than this moment is stored in the memory device 58 until the reversing start signal is generated. In consequence, the memory device 56 memorizes the air flow rate $Q_1$ in the backward direction while the memory device 58 memorizes the air flow rate $Q_2$ in the forward direction. The operation unit 52 periodically reads out the content of memory of the memory devices 56 and 58 and delivers the read-out content to the operation unit 60 to conduct the subtraction to calculate the true air flow rate $Q_0 m^3$, i.e. $Q_2 - Q_1$.

Figure 5:
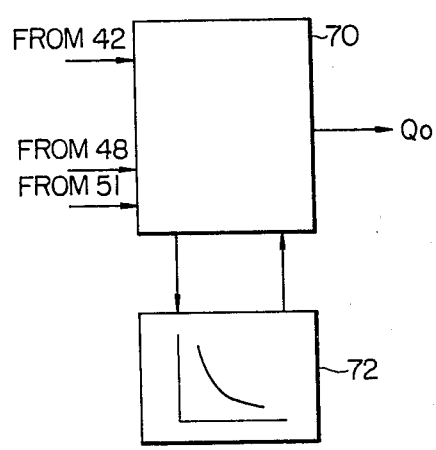
FIG. 5 is a block diagram of another embodiment.
Figure 6:
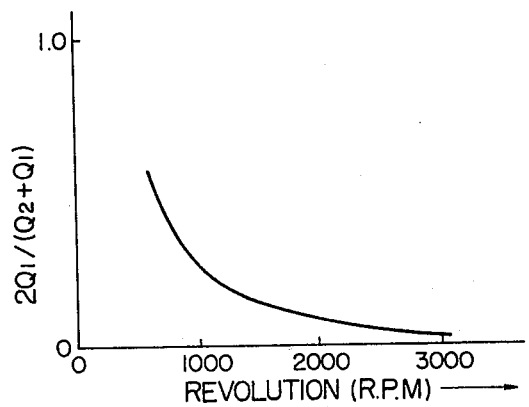
FIG. 6 is a graphical representation of the content of a memory device.

Referring now to FIG. 5 which is a block diagram of another embodiment, there are shown only an operation unit 70 for accumulating the signal of the data processing unit 42 and a memory device 72 for memorizing a predetermined data. FIG. 6 shows the result of measurement of the ratio between the difference between the apparent total air flow rate $Q_a(=Q_1+Q_2)$ and the true air flow rate $Q_0(=Q_2-Q_1)$, i.e. $2Q_1$ and the apparent total intake air flow rate $Q_0$. Since the true air flow rate $Q_0$ is expressed by the following equation (3), the true air flow rate is determined by executing this calculation.

$$Q_0 = (Q_1 + Q_2) \times \{(1 - 2Q_1/Q_1 + Q_2)\} = Q_2 - Q_1 \quad (3)$$

As shown in FIG. 6, the value $2Q_1/Q_1+Q_2$ is determined by the speed N of the engine, so that the value $1-2Q_1/Q_1+Q_2$ is beforehand memorized by the memory device 72. On the other hand, the operation unit 70 calculates the apparent total air flow rate $Q_a=Q_3-Q_1$ and reads the content of the memory device 72 in accordance with the engine speed and performs the calculation of the equation (3) to determine the true air flow rate $Q_0$.

Figure 2:
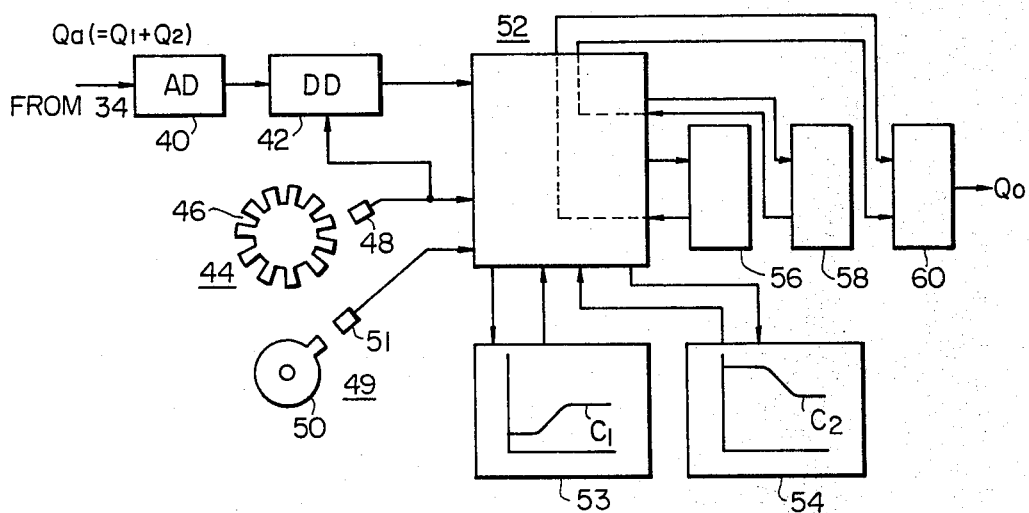
FIG. 2 is a block diagram of a signal processing unit in an embodiment of the invention.
Figure 7:
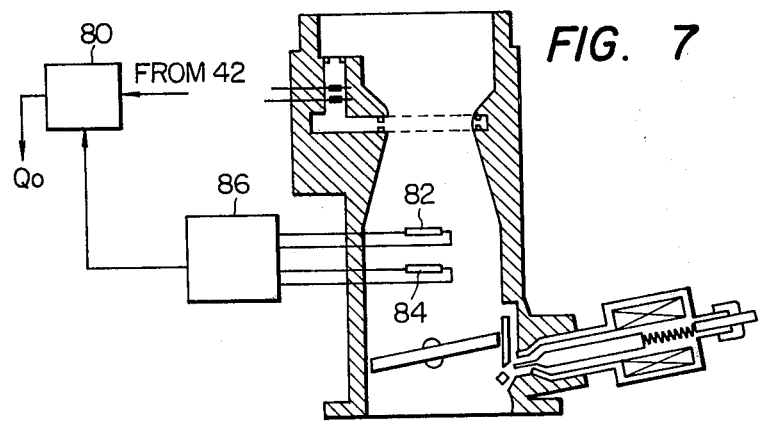
FIG. 7 is a sectional view of still another embodiment.
Figure 8:
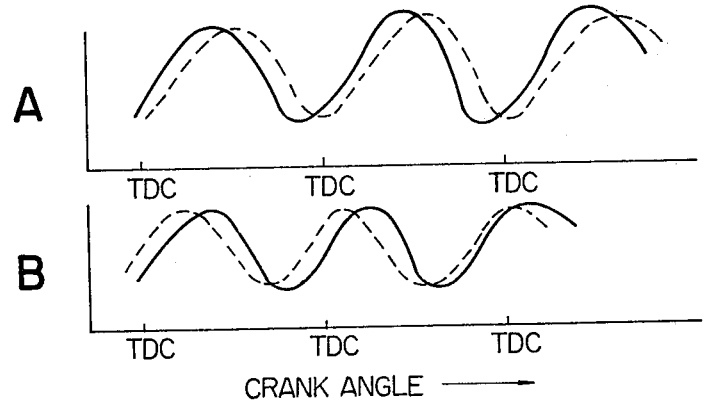
FIG. 8 is a graphical representation of operation of the device shown in FIG. 7.

FIG. 7 shows still another embodiment of the invention. More specifically, this Figure shows only an operation unit 80, two hot wire type sensors 82,84 and a drive control circuit 86. The waveforms of signals sensed by the sensors 82,84 have phase difference from each other in relation to the crank angle, as will be seen from FIG. 8A. During the sucking of the sucking of the air by the internal combustion engine, the output from the donwstream side sensor 84 lags behind that from the upstream side sensor 82. This phase relation is reversed during the reversing or backward flow of the intake air, as shown in FIG. 8B. Therefore, the drive control circuit 86 detects the phases and makes a judgement and supplies a signal representing the reversing period to the operation unit 80 which in turn accumulates the output from the hot wire type air flow meter and determines the intake air flow rates $Q_1$ and $Q_2$ in the backward and forward directions. Thereafter, the true air flow rate $Q_0$ is determined in the manner identical to that explained before in connection with FIG. 2.

Figure 9:
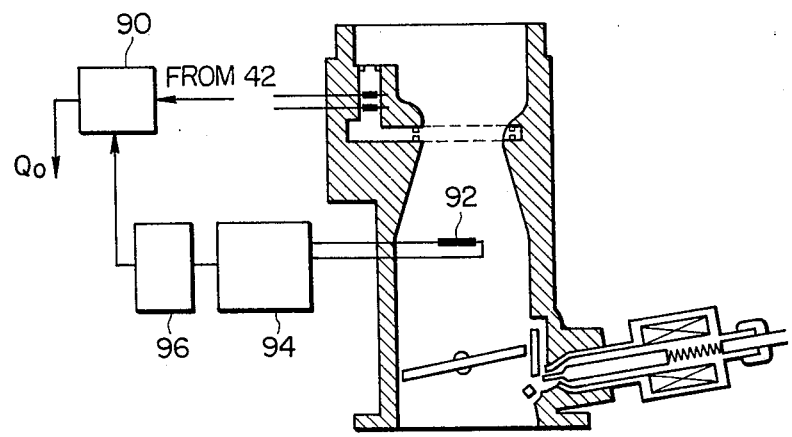
FIG. 9 is a sectional view of a further embodiment.
Figure 10:
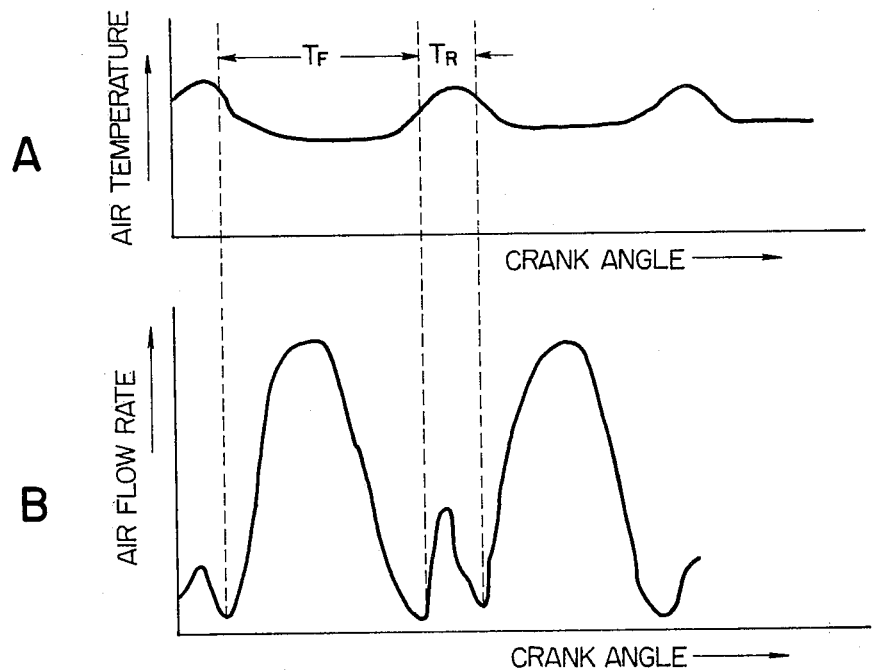
FIG. 10 is a graphical representation of operation of the device shown in FIG. 9.

FIG. 9 shows a further embodiment. In this Figure, there are shown an operation unit 90, temperature sensor 92, drive control circuit 94 and a reverse flow discrimination circuit 96. As will be understood from FIG. 10, the temperature of the air during the reversing period $T_R$ is higher than that during the period of forward flow of the air. It is, therefore, possible to obtain a signal representing the period of reversing flow by setting the temperature by the reverse flow discriminating circuit 96. Then, the true air flow rate $Q_0$ is determined in the same manner as that explained before in connection with FIG. 2.

What is claimed is:

1. An air flow rate measuring device making use of a hot wire type air flow meter comprising: a hot wire type air flow meter including a hot wire type flow rate measuring sensor disposed in the intake air passage of an internal combustion engine and a control drive circuit connected to said sensor, said hot wire type air flow meter being adapted to produce a first signal corresponding to the flow rate of air in said intake air passage; a reversing flow signal generating means adapted to generate a second signal representing the period of occurence of reversing or backward flow of air in said intake air passage; a first operation unit connected to said control drive circuit and said reversing flow signal generating means and adapted to generate, upon accumulation of the first signal representing said flow rate of air, a third signal representing the amount of air in said period of occurence of reversing flow and a fourth signal representing the amount of air in the period other than said period of occurence of reversing flow; and a second operation unit adapted for subtracting said third signal from said fourth signal derived from said first operation unit.

2. An air flow rate measuring device making use of a hot wire type air flow meter as claimed in claim 1, wherein said reversing flow signal generating means is a memory device adapted to memorize the crank angle at which the reversing flow is commenced and the crank angle at which the reversing flow is ceased in relation to the engine speed, and to deliver the crank angles in accordance with the actual engine speed.

3. An air flow rate measuring device making use of a hot wire type air flow meter as claimed in claim 1, wherein said reversing flow signal generating means include a pair of hot wire type sensors disposed at an upstream portion and a downstream portion of said air passage, and a drive control circuit adapted for discriminating the phase relation between the outputs from said sensors.

4. An air flow rate measuring device making use of a hot wire type air flow meter as claimed in claim 1, wherein said reversing flow signal generating means include a temperature sensor disposed in the air passage, a drive control circuit connected to said temperature sensor, and a reversing flow discrimination circuit adapted to produce an output over a period in which the output from said drive control circuit representing the temperature exceeds a predetermined level.

* * * * *